United States Patent
Fattal et al.

(10) Patent No.: US 11,320,578 B2
(45) Date of Patent: May 3, 2022

(54) MULTIVIEW DISPLAY, SYSTEM, AND METHOD HAVING DYNAMIC COLOR SUB-PIXELS REMAPPING

(71) Applicant: LEIA INC., Menlo Park, CA (US)

(72) Inventors: David A. Fattal, Menlo Park, CA (US); Daniel Geisler, Jr., Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/352,331

(22) Filed: Jun. 20, 2021

(65) Prior Publication Data

US 2021/0311244 A1 Oct. 7, 2021

Related U.S. Application Data (63) Continuation of application No. PCT/US2018/067644, filed on Dec. 27, 2018.

(51) Int. Cl.
G09G 3/00 (2006.01)
G09G 3/34 (2006.01)
F21V 8/00 (2006.01)

(52) U.S. Cl.
CPC ............ *G02B 6/005* (2013.01); *G09G 3/003* (2013.01); *G09G 3/3406* (2013.01); *G09G 3/3473* (2013.01); *G09G 2354/00* (2013.01)

(58) Field of Classification Search
CPC ........ G02B 6/005; G02B 30/31; G09G 3/003; G09G 3/3406; G09G 3/3473; G09G 2354/00; G02F 1/1323
See application file for complete search history.

(56) References Cited

U.S. PATENT DOCUMENTS

| | | | | |
|---|---|---|---|---|
| 5,521,724 A | * | 5/1996 | Shires | G02B 5/32 359/15 |
| 5,689,283 A | * | 11/1997 | Shirochi | C03B 37/01486 345/213 |
| 6,606,078 B2 | * | 8/2003 | Son | H04N 13/31 345/6 |
| 9,128,226 B2 | | 9/2015 | Fattal et al. | |

(Continued)

FOREIGN PATENT DOCUMENTS

| | | |
|---|---|---|
| WO | 2012038856 A1 | 3/2012 |
| WO | 2020131087 A1 | 6/2020 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

(Continued)

*Primary Examiner* — Benyam Ketema
(74) *Attorney, Agent, or Firm* — J. Michael Johnson (57) ABSTRACT

A multiview display, system and method includes an array of light valves having a repeating plurality of color sub-pixels and arranged as a plurality of multiview pixels configured to modulate directional light beams as color pixels of views of a multiview image, and an array of multibeam emitters configured to provide the directional light beams. A location of a multiview pixel relative to a location of color sub-pixels is configured to be shifted as a function of a position of a user of the multiview display to provide dynamic color sub-pixel remapping.

20 Claims, 5 Drawing Sheets

(56) References Cited

U.S. PATENT DOCUMENTS

| | | | |
|---|---|---|---|
| 9,201,270 B2 * | 12/2015 | Fattal | G02B 30/33 |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,511,830 B2 | 12/2019 | Huang | |
| 10,551,546 B2 | 2/2020 | Fattal | |
| 10,649,128 B2 | 5/2020 | Fattal et al. | |
| 10,798,371 B2 | 10/2020 | Fattal | |
| 10,802,212 B2 | 10/2020 | Fattal | |
| 10,802,443 B2 | 10/2020 | Fattal | |
| 10,810,917 B2 | 10/2020 | Fattal | |
| 10,830,939 B2 | 11/2020 | Fattal et al. | |
| 10,838,134 B2 | 11/2020 | Fattal et al. | |
| 10,884,175 B2 | 1/2021 | Fattal | |
| 10,928,564 B2 | 2/2021 | Fattal | |
| 10,928,677 B2 | 2/2021 | Aieta et al. | |
| 11,016,235 B2 | 5/2021 | Fattal et al. | |
| 2007/0018585 A1 * | 1/2007 | Ijzerman | H04N 13/351 |
| | | | 315/15 |
| 2009/0322986 A1 | 12/2009 | Wei et al. | |
| 2011/0211256 A1 * | 9/2011 | Connor | G09G 3/3473 |
| | | | 359/463 |
| 2011/0310233 A1 * | 12/2011 | Bathiche | H04N 13/32 |
| | | | 348/51 |
| 2012/0200807 A1 | 8/2012 | Wei et al. | |
| 2013/0088526 A1 * | 4/2013 | Koito | H04N 13/398 |
| | | | 345/690 |
| 2013/0169518 A1 | 7/2013 | Wu et al. | |
| 2013/0328864 A1 | 12/2013 | Lee et al. | |
| 2014/0247330 A1 | 9/2014 | Baik et al. | |
| 2015/0029317 A1 * | 1/2015 | Kim | H04N 13/106 |
| | | | 348/59 |
| 2015/0036068 A1 * | 2/2015 | Fattal | G02F 1/133615 |
| | | | 349/15 |
| 2016/0377877 A1 * | 12/2016 | Pijlman | G02F 1/29 |
| | | | 359/315 |
| 2017/0363794 A1 | 12/2017 | Wan et al. | |
| 2018/0278923 A1 | 9/2018 | Fattal | |
| 2019/0155105 A1 * | 5/2019 | Aieta | G02B 6/0033 |
| 2019/0302336 A1 | 10/2019 | Fattal et al. | |
| 2019/0302340 A1 | 10/2019 | Ma et al. | |
| 2019/0339452 A1 | 11/2019 | Fattal et al. | |
| 2020/0051513 A1 * | 2/2020 | Fattal | G02B 30/33 |
| 2020/0301165 A1 | 9/2020 | Fattal | |
| 2020/0310135 A1 | 10/2020 | Fattal | |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

International Search Report and Written Opinion (ISRWO) by International Searching Authority (ISA) Korean Intellectual Property Office (KIPO) dated Sep. 26, 2019 (13 pages) for foreign counterpart parent International (PCT) Application No. PCT/US2018/067644.

* cited by examiner

MULTIVIEW DISPLAY, SYSTEM, AND METHOD HAVING DYNAMIC COLOR SUB-PIXELS REMAPPING

CROSS-REFERENCE TO RELATED APPLICATIONS

This application is a continuation application of and claims the benefit of priority to International Patent Application No. PCT/US2018/067644, filed Dec. 27, 2018, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview display employing dynamic color sub-pixel remapping. In various embodiments consistent with the principles herein, a multiview display is provided. The multiview display is configured to shift a location of a multiview pixel relative to a location of color sub-pixels as a function of a position of a user of the multiview display. The shift provides dynamic color sub-pixel shifting or remapping that may mitigate color fringing on the multiview display, according to some embodiments.

Herein a 'two-dimensional display' or '2D display' is defined as a display configured to provide a view of an image that is substantially the same regardless of a direction from which the image is viewed (i.e., within a predefined viewing angle or viewing range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three-dimensional image (3D image).

Figure 1A:
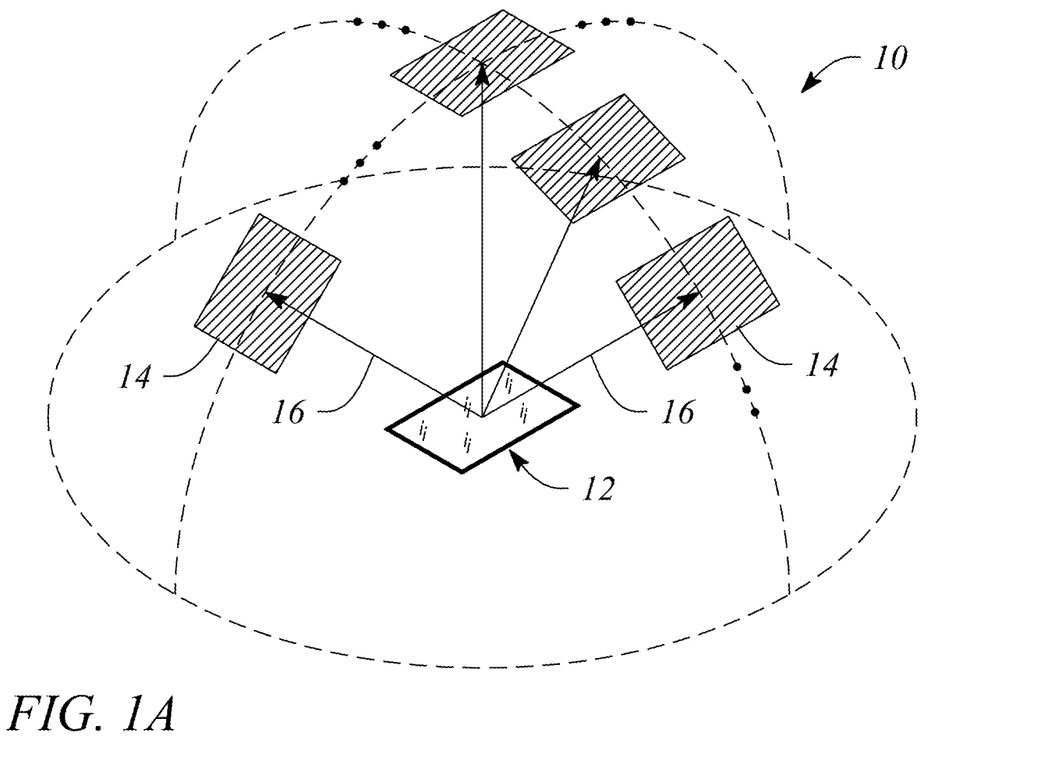
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\varphi$ is an angle in a horizontal plane (e.g., parallel to the multiview display screen plane).

Figure 1B:
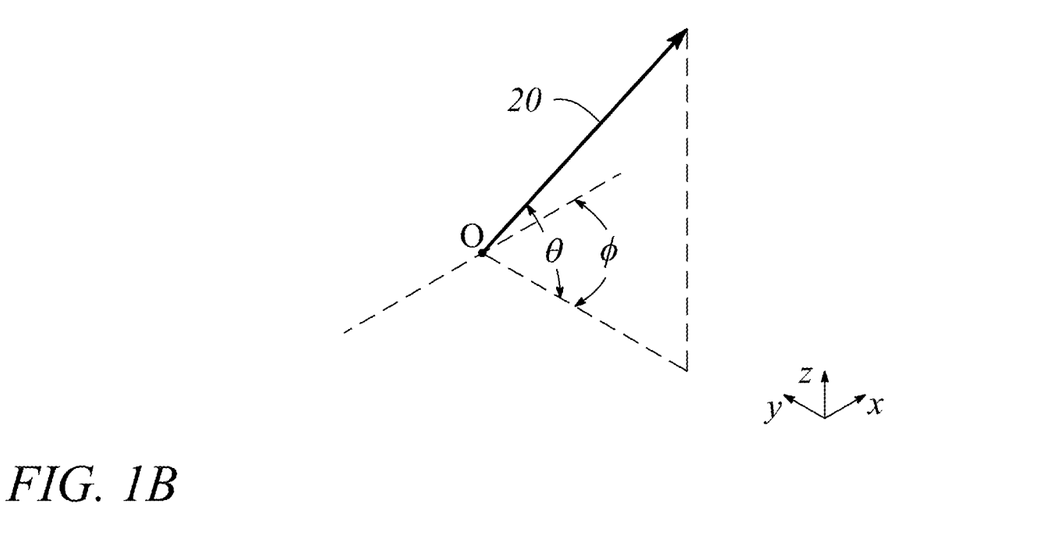
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each of a similar plurality of different views of a multiview display. In particular, a multiview pixel may have an individual pixel or set of pixels corresponding to or representing a view pixel in each of the different views of the multiview image. By definition herein therefore, a 'view pixel' is a pixel or set of pixels corresponding to a view in a multiview pixel of a multiview display. In some embodiments, a view pixel may include one or more color sub-pixels. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x1, y1\}$ in each of the different views of a multiview image, while a second multiview pixel may have individual view pixels located at $\{x2, y2\}$ in each of the different views, and so on.

In some embodiments, a number of view pixels in a multiview pixel may be equal to a number of views of the multiview display. For example, the multiview pixel may provide sixty-four (64) view pixels associated with a multiview display having 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of view pixels (i.e., pixels that make up a selected view) in the multiview display views each view of the multiview display. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

By definition herein, a 'multibeam emitter' is a structure or element of a backlight or a display that produces light that includes a plurality of light beams. In some embodiments, the multibeam emitter may be optically coupled to a light guide of a backlight to provide the light beams by coupling out a portion of light guided in the light guide. In such embodiments, a multibeam emitter may comprise a 'multibeam element.' In other embodiments, the multibeam emitter may generate light emitted as the light beams (i.e., may comprise a light source). Further, the light beams of the plurality of light beams produced by a multibeam emitter have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam emitter. In some embodiments, the multibeam emitter may be considered an 'extended point light source', i.e., a plurality of point light sources distributed across an extent of the multibeam emitter, by definition herein. Further, a light beam produced by the multibeam emitter has a principal angular direction given by angular components $\{\theta, \phi\}$, by definition herein, and as described above with respect to FIG. 1B.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm 20°$). In other embodiments, the broad-angle emitted light cone angle may be greater than about thirty degrees (e.g., $>\pm 30°$), or greater than about forty degrees (e.g., $>\pm 40°$), or greater than about fifty degrees (e.g., $>\pm 50°$). For example, the cone angle of the broad-angle emitted light may be about sixty degrees (e.g., $\pm 60°$).

In some embodiments, the broad-angle emitted light cone angle may be defined to be about the same as a viewing angle of an LCD computer monitor, an LCD tablet, an LCD television, or a similar digital display device meant for broad-angle viewing (e.g., about $\pm 40$-$65°$). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'a color sub-pixel' means one or more color sub-pixels and as such, 'the color sub-pixel' means 'color sub-pixel(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
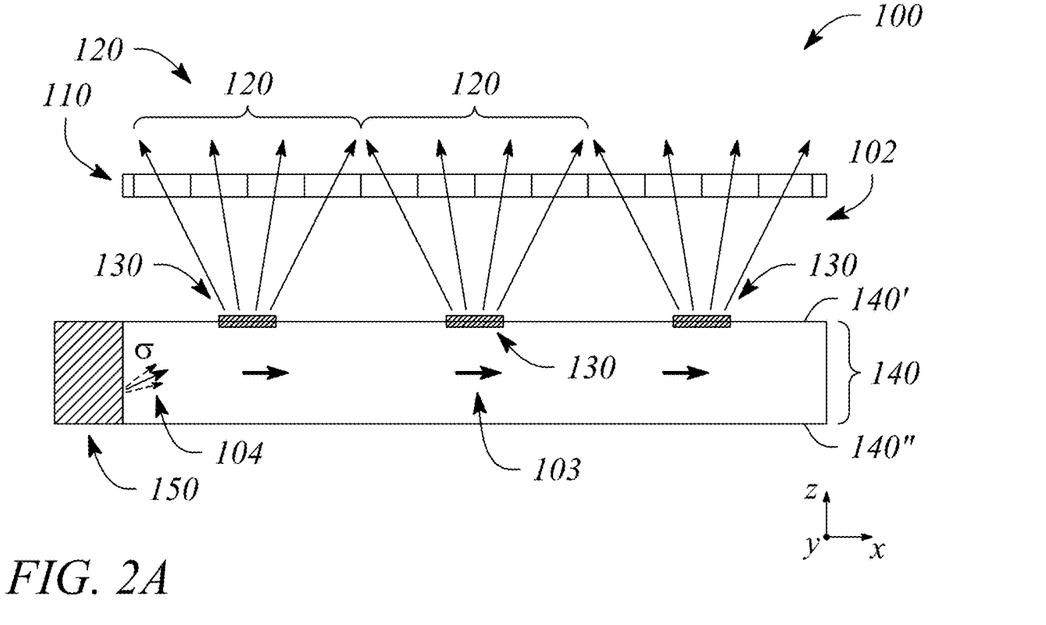
FIG. 2A illustrates a cross-sectional view of a multiview display in an example, according an embodiment consistent with the principles described herein.
Figure 2B:
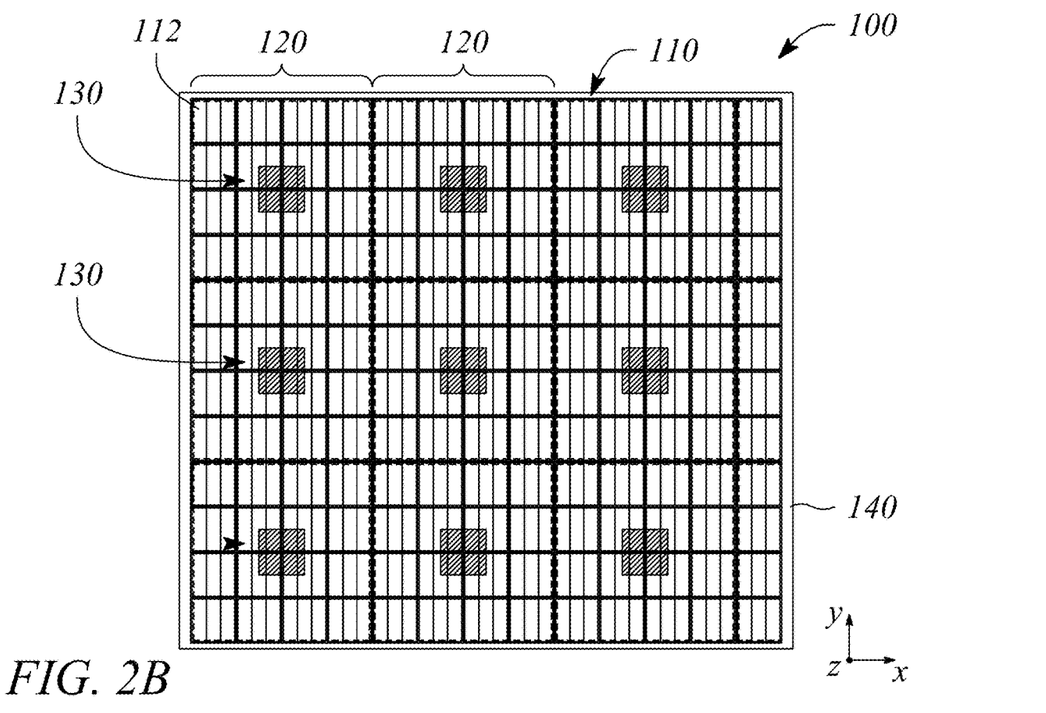
FIG. 2B illustrates a plan view of the multiview display in an example, according to an embodiment consistent with the principles described herein.
Figure 2C:
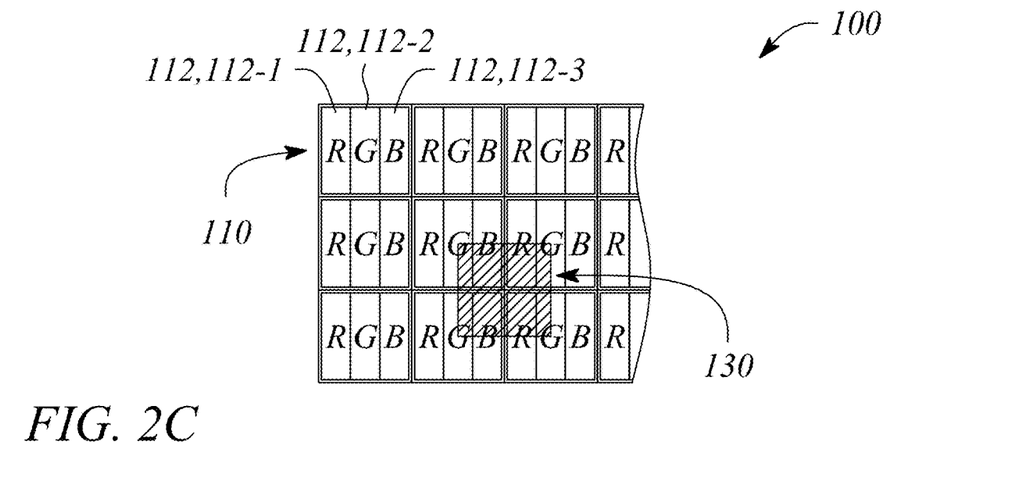
FIG. 2C illustrates a plan view of a portion of the multiview display of FIG. 2B in an example, according to an embodiment consistent with the principles described herein.

According to some embodiments of the principles described herein, a multiview display that provides dynamic color sub-pixel remapping. FIG. 2A illustrates a cross-sectional view of a multiview display 100 in an example, according to an embodiment consistent with the principles described herein. FIG. 2B illustrates a plan view of the multiview display 100 in an example, according to an embodiment consistent with the principles described herein. FIG. 2C illustrates a plan view of a portion of the multiview display 100 of FIG. 2B in an example, according to an embodiment consistent with the principles described herein. According to various embodiments, the multiview display 100 illustrated in FIGS. 2A-2C may employ dynamic color sub-pixel remapping to mitigate color fringing in or associated with a multiview image displayed by or on the multiview display 100.

The multiview display 100 comprises an array of light valves 110. FIGS. 2A and 2B also illustrate light valves 110 of the light valve array arranged as a plurality of multiview pixels 120, outlined by dashed lines in FIG. 2B. According to various embodiments, the light valve array may comprise any of a variety of different types of light valves including, but not limited to, a liquid crystal light valve, an electrophoretic light valve, and a light valve based on electrowetting.

As illustrated in FIGS. 2B and 2C, the array of light valves 110 comprises a repeating plurality of color sub-pixels 112 configured to modulate directional light beams as color pixels of different views of a multiview image displayed on or by the multiview display 100. In particular, each light valve 110 of the light valve array includes the plurality of color sub-pixels 112. As such, across the light valve array the plurality of color sub-pixels 112 repeats from one light valve 110 to an adjacent light valve 110 as the repeating color sub-pixel plurality.

In some embodiments, as illustrated in FIG. 2C, a light valve 110 of the array of light valves 110 may comprise the plurality of color sub-pixels 112 having a first color sub-pixel 112-1, a second color sub-pixel 112-2, and a third color sub-pixel 112-3. Further, as illustrated in FIG. 2C, the plurality of color sub-pixels 112 may be the same in each light valve 110 of the light valve array. As a result, the color sub-pixel plurality having the first, second, and third color sub-pixels 112-1, 112-2, 112-3 may repeat across the light valve array (e.g., in a row direction), according to various embodiments.

In some embodiments, a color sub-pixel 112 of the repeating color sub-pixel plurality may have or represent a different color from another color sub-pixel of the repeating color sub-pixel plurality (e.g., each color sub-pixel 112 may include a different color filter representing a different color). For example, the first color sub-pixel 112-1 may be a red color sub-pixel (R), the second color sub-pixel 112-2 may be a green color sub-pixel (G), and the third color sub-pixel 112-3 may be a blue color sub-pixel (B), e.g., as illustrated in FIG. 2C. Since the color sub-pixel plurality repeats along a row of the array of light valves 110, the repeating color sub-pixel plurality comprises a repeating set of red (R), green (G), and blue (B) color sub-pixels 112, as illustrated in FIG. 2C by way of example and not limitation. The repeating set of red (R), green (G), and blue (B) color sub-pixels 112 may be consistent with a red-green-blue (RGB) color model used to display color multiview images with the multiview display 100, according to some embodiments. In other non-limiting examples and embodiments (not illustrated), the repeating plurality of color sub-pixels 112 may include, but is not limited to, a repeating set that includes red (R), green (G), and blue (B), and yellow (Y) color sub-pixels 112 (RGBY) and a repeating set that includes red (R), green (G), and blue (B), and white (W) color sub-pixels 112 (RGBW).

As illustrated on FIG. 2B (and discussed above), light valve array with the repeating plurality of color sub-pixels 112 is arranged as a plurality of multiview pixels 120 of the multiview display 100. Each multiview pixel of the plurality of multiview pixels 120 comprises a different subset of the repeating plurality of color sub-pixels 112. Each multiview pixel 120 is configured to modulate directional light beams as color pixels of different views of the multiview display 100. The modulated light beams represent the respective different colors of the color sub-pixels 112 of the color sub-pixel plurality within the color pixels of the multiview display 100. Further, individual light valves 110 within each multiview pixel 120 of the multiview pixel plurality represent different ones of the different views of the multiview image or equivalently of the multiview display 100, according to various embodiments.

By way of example and not limitation, the multiview display 100 illustrated in FIGS. 2B-2C includes multiview pixels 120 representing a four-by-four (4×4) arrangement of different views. That is, the illustrated multiview display 100 has multiview pixels 120 configured to provide sixteen (16) different views in a full parallax mode. Accordingly, each multiview pixel 120 of the plurality includes sixteen (16) light valves 110, each light valve comprising three (3) color sub-pixels 112, as illustrated. In particular, as illustrated each light valves 110 comprises a set of three consecutive color sub-pixels 112 including a red (R) color sub-pixel 112, a green (G) color sub-pixel 112, and a blue (B) color sub-pixel 112. The plurality of multiview pixels 120 may be arranged in rows and columns of multiview pixels 120 (e.g., as illustrated), according to some embodiments.

According to various embodiments, a location of a multiview pixel 120 of the multiview pixel plurality relative to a location of color sub-pixels 112 of the light valve array is configured to be shifted as a function of a position of a user 101 of the multiview display 100. The shift may provide dynamic color sub-pixel remapping of or with respect to multiview pixels 120 of the multiview display 100. According to some embodiments, the dynamic color sub-pixel remapping may mitigate color fringing within a multiview image displayed on the multiview display 100 when the user 101 views the multiview image from the position used to determine the shift.

Figure 3A:
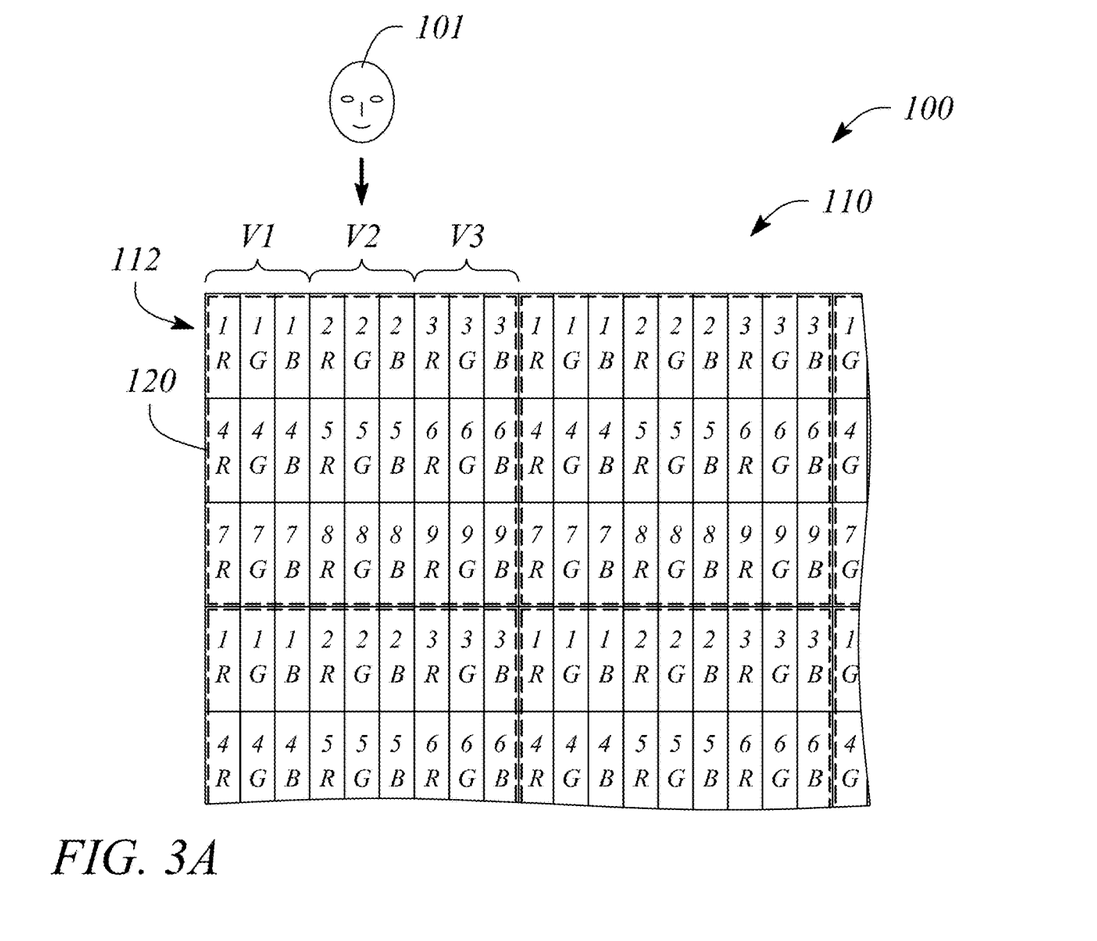
FIG. 3A illustrates a plan view of a portion of a multiview display in an example, according to an embodiment consistent with the principles described herein.

FIG. 3A illustrates a plan view of a portion of a multiview display 100 in an example, according to an embodiment consistent with the principles described herein. As illustrated in FIG. 3A, a multiview pixel 120 spans from a red (R) color sub-pixel 112 at an upper left corner to a blue (B) color sub-pixel 112 at a lower right corner of the multiview pixel 120. Further, a first view V1 may correspond to a first set of three color sub-pixels 112 (R, G, B) at the upper left corner, a second view V2 may correspond to a second set of three color sub-pixels 112 (R, G, B) adjacent and to the right of the first set, and a third view V3 may correspond to a third set of three color sub-pixels 112 (R, G, B) adjacent and to the right of the second set, as illustrated.

When the user 101 views the multiview display 100 from a location centered on view V2, the user 101 will experience a multiview image that is free of color fringing. That is, the views V1, V2, V3 will be color balanced when the location of the user 101 is centered on view V2 along the repeating plurality of color sub-pixels 112, i.e., along a row. In FIG. 3A, an arrow indicates a line of sight of the user 101 viewing the multiview display 100. Accordingly, the line of sight of the user 101 is aligned with the center of view V2 (or the second set of color sub-pixels 112) of the multiview pixel 120. Since the user 101 is aligned with the center of view V2 (or the multiview pixel 120), the user 101 will experience a color-balanced view of view V2 or more generally of the multiview image. However, if the user 101 were to move to slightly to the right or left, the user 101 may experience a multiview image that lacks color balance or that includes color fringing. For example, view V2 may include a bluish artifact, while view V3 may include a red ghost or artifact when viewed by the user 101.

Figure 3B:
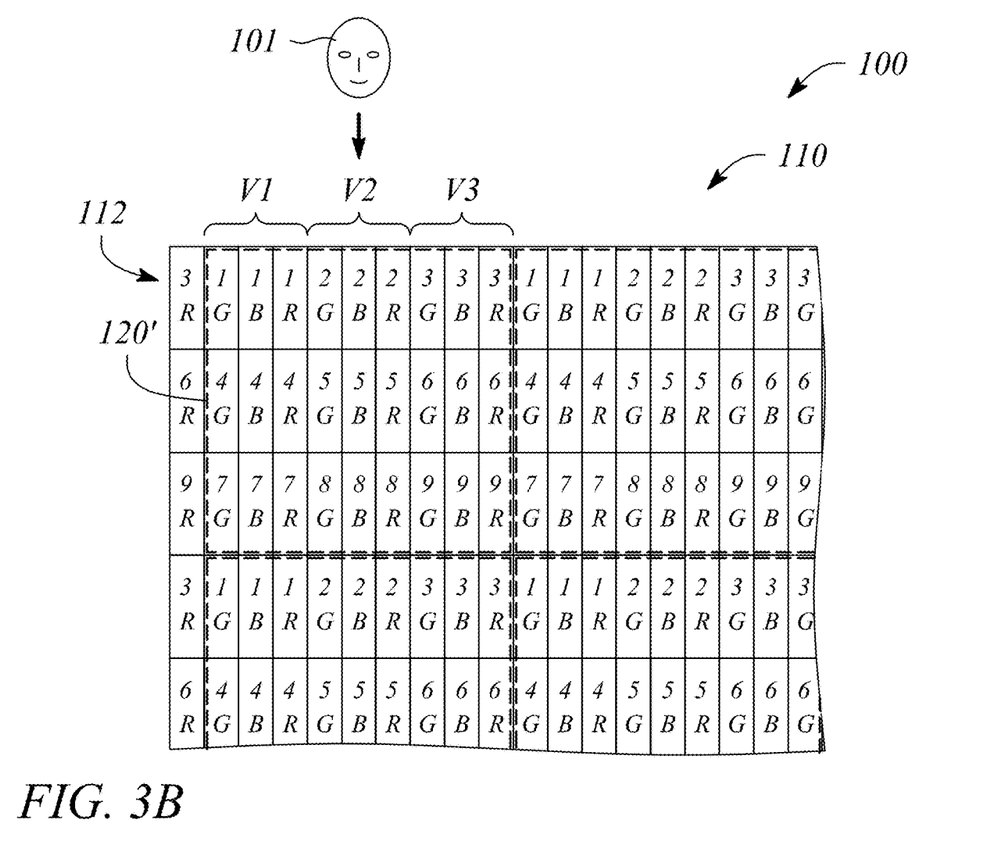
FIG. 3B illustrates plan view of a portion of the multiview display of FIG. 3A in another example, according to an embodiment consistent with the principles described herein.

FIG. 3B illustrates plan view of a portion of the multiview display 100 of FIG. 3A in another example, according to an embodiment consistent with the principles described herein. In particular, the multiview display 100 is the same multiview display 100 illustrated in FIG. 3A. However, FIG. 3B illustrates the user 101 at a new location that is to the right such that, while the user 101 may continue to observe the view V2, the line of sight of the user has moved with the user to be aligned with a color sub-pixel 112 that is off center of view V2 or the multiview pixel 120, as originally illustrated in FIG. 3A. Since the line of sight of the user 101 is off center, the multiview image may lack color balance if the original multiview pixel 120 of FIG. 3A were to be used.

However, FIG. 3B illustrates a multiview pixel 120' having a location that is shifted relative to the color sub-pixels 112 as a function of the new user location. Accordingly, the multiview pixel 120' is shifted to a new location such that the multiview pixel 120' spans from a green (G) color sub-pixel 112 (of view V1) at an upper left corner to a red (R) color sub-pixel 112 (of view '9') at a lower right corner of the multiview pixel 120'. Further, after the shift, the first view V1 corresponds to a first set of three color sub-pixels 112 (G, B, R) at the upper left corner, a second view V2 corresponds to a second set of three color sub-pixels 112 (G, B, R) adjacent and to the right of the first set, and the third view V3 corresponds to a third set of three color sub-pixels 112 (G, B, R) adjacent and to the right of the second set, as illustrated in FIG. 3B. Each of the three views V1, V2, V3 still have a full complement of color sub-pixels 112, but the color balance is restored by the shift of the multiview pixel 120 relative to the color sub-pixels 112 of the light valve array. As with FIG. 3A, an arrow indicates a line of sight of the user 101 viewing the multiview display 100 in FIG. 3B.

According to some embodiments, a shift distance of the multiview pixel location may be an integer multiple of a size of a color sub-pixel 112 of the repeating color sub-pixel plurality. For example, in FIG. 3B the multiview pixel 120' is shifted by a width of one (1) color sub-pixel 112 in a row direction of the repeating plurality of color sub-pixels 112 in response to the movement in location of the user 101, compared to the position of the multiview pixel 120 in FIG. 3A prior to the movement. In other embodiments (not illustrated), the shift distance may amount to two widths, three widths, and so on, of a color sub-pixel 112, for example, As a result, the multiview pixel 120 is remapped to a different set of color sub-pixels 112 of the repeating plurality of color sub-pixels 112 to reposition the line of sight of the user 101 on the center of multiview pixel 120 or more specifically to a center of the second set of color sub-pixels 112 corresponding to view V2. In doing so, a different set of color sub-pixels 112 form the multiview pixel 120' in FIG. 3B as compared to the multiview pixel 120 of FIG. 3A. Thus, whereas the multiview pixel 120 of FIG. 3A spanned from the red (R) color sub-pixel 112 to a blue (B) color sub-pixel 112 along a first row of the repeating plurality of color sub-pixels 112, the multiview pixel 120' illustrated in FIG. 3B spans from the green (G) color sub-pixel 112 to a red (R) color sub-pixel 112 along the same repeating plurality of color sub-pixels 112. Correspondingly, view V2 of the multiview pixel 120 is shifted from the set of color sub-pixels 112 (R, G, B) in FIG. 3A to the different set of color sub-pixels 112 (G B, R) in FIG. 3A, which re-centers view V2 on the line of sight of the user 101. All other views in the multiview pixel 120' are similarly shifted in the same direction along the repeating plurality of color sub-pixels 112, by the shift. Further, the shift is a row direction of the light valve array, as illustrated in FIGS. 3A-3B.

According to various embodiments, the shift of the multiview pixel 120, 120' in response to change in a location by the user 101 may be performed while the multiview display 100 is active and displaying the multiview image. Accordingly, remapping of the color sub-pixels 112 performed with the shift of the multiview pixel location may be accomplished dynamically. Herein, therefore, dynamic sub-pixel remapping is defined as the reassignment of at least one color sub-pixel 112 to a different multiview pixel 120 while the multiview display 100 is active. The dynamic color sub-pixel remapping of the multiview display 100 is configured to mitigate color fringing associated with the color pixels of the multiview image. In particular, the shift of the multiview pixels 120 help minimize uneven overlap between directional light beams 102 of different colors that can emphasize certain colors in a pixel over other colors, depending on the position and view point of the user 101.

Referring again to FIGS. 2A-2C, the illustrated multiview display 100 further comprises an array of multibeam emitters 130. The multibeam emitters 130 are configured to provide the directional light beams 102 modulated by the plurality of color sub-pixels 112 of the light valve array. The directional light beams 102 may have principal angular directions corresponding to respective different view directions of the multiview display 100 or equivalently of different views of the multiview image displayed on or by the multiview display 100. In particular, FIG. 2A illustrates the directional light beams 102 as a plurality of diverging arrows depicted as being directed way from the multibeam emitters 130 in a direction toward the light valve array.

In some embodiments, a size of the multibeam emitter 130 is comparable to a size of a light valve 110 of the multiview display 100. Herein, the 'size' may be defined in any of a variety of manners to include, but not be limited to, a length, a width or an area. For example, the size of a light valve 110 may be a length thereof and the comparable size of the multibeam emitter 130 may also be a length of the multibeam emitter 130. In another example, size may refer to an area such that an area of the multibeam emitter 130 may be comparable to an area of the light valve 110. In some embodiments, the size of the multibeam emitter 130 is comparable to the light valve size such that the multibeam emitter size is between about fifty percent (50%) and about two hundred percent (200%) of the light valve size.

In some embodiments, the multiview display 100 may comprise a light guide 140, e.g., as illustrated. The light guide 140 is configured to guide light along a length of the light guide as guided light 104 (i.e., a guided light beam 104). For example, the light guide 140 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 140, for example.

In some embodiments, the light guide 140 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 140 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 140 may further include a cladding layer (not illustrated) on at least a portion of a surface (e.g., one or both of the first surface and the second surface) of the light guide 140. The cladding layer may be used to further facilitate total internal reflection, according to some examples.

Further, according to some embodiments, the light guide 140 is configured to guide the guided light 104 according to total internal reflection at a non-zero propagation angle between a first surface 140' (e.g., front or top surface or side) and a second surface 140" (e.g., back or bottom surface or side) of the light guide 140. In particular, the guided light 104 propagates by reflecting or 'bouncing' between the first surface 140' and the second surface 140" of the light guide 140 at the non-zero propagation angle. In some embodiments, the guided light 104 comprises a plurality of guided light beams having different colors of light from one another and being guided by the light guide 140 at respective ones of different color-specific, non-zero propagation angles. Note, the non-zero propagation angle is not illustrated in FIG. 2A for simplicity of illustration. However, a bold arrow depicting a propagation direction 103 illustrates a general propagation direction of the guided light 104 along the light guide length in FIG. 2A.

According to some embodiments, the multibeam emitters 130 of the array may be located at or adjacent to the first surface 140' of the light guide 140, for example, as illustrated in FIG. 2A. In other embodiments (not illustrated), the plurality of multibeam emitters 130 may be located on a second surface 140" of the light guide 140. In yet other embodiments (not illustrated), the multibeam emitters 130 of the plurality may be located inside the light guide 140 between the first surface 140' and the second surface 140". Further, in yet other embodiments (not illustrated), the light guide 140 may be replaced by another substrate (e.g., a non light guide substrate).

In some embodiments (e.g., embodiments that employ the light guide 140 as in FIG. 2A), the multibeam emitter 130 of the multiview display 100 may comprise a multibeam element 130'. The multibeam element 130' of the multiview display 100 is configured to scatter out light from the light guide 140 as a plurality of directional light beams having principal angular directions corresponding to view directions of the multiview image. According to various embodiments, the multibeam element 130' may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 130' comprising a diffraction grating is configured to diffractively scatter out the guided light portion as the plurality of directional light beams having the different principal angular directions. In other embodiments, the multibeam element 130' comprising a micro-reflective element is configured to reflectively scatter out the guided light portion as the plurality of directional light beams, or the multibeam element 130' comprising a micro-refractive element is configured to scatter out the guided light portion as the plurality of directional light beams by or using refraction (i.e., refractively scatter out the guided light portion).

Further in embodiments that employ the light guide 140, the multiview display 100 may further comprise a light source 150 configured to provide the light to be guided within light guide 140. In particular, the light source 150 may be located adjacent to an entrance surface or end (input end) of the light guide 140. In various embodiments, the light source 150 may comprise substantially any source of light (e.g., optical emitter) including, but not limited to, one or more light emitting diodes (LEDs) or a laser (e.g., laser diode). In some embodiments, the light source 150 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 150 may be a substantially broadband light source configured to provide substantially broadband or polychromatic light. For example, the light source 150 may provide white light. In some embodiments, the light source 150 may comprise a plurality of different optical emitters configured to provide different colors of light. The different optical emitters may be configured to provide light having different, color-specific, non-zero propagation angles of the guided light corresponding to each of the different colors of light.

In some embodiments, the guided light 104 may be collimated or equivalently may be a collimated light beam (e.g., provided by a collimator, as described below). Herein, a 'collimated light' or 'collimated light beam' is generally defined as a beam of light in which rays of the light beam are substantially confined to a predetermined or defined angular spread within the light beam (e.g., the guided light 104). Further, rays of light that diverge or are scattered from the collimated light beam are not considered to be part of the collimated light beam, by definition herein. Moreover, the guided light 104 may be collimated according to or having a collimation factor σ, in various embodiments.

In other embodiments (not illustrated), the multibeam emitters 130 may comprise an active emitter such as, but not limited to, a micro light emitting diode and a micro organic light emitting diode. In these embodiments, the light guide and light source may be omitted. Instead, the light guide 140 may be replaced by a substrate to support and provide power to the multibeam emitters 130, as mentioned above.

Figure 4:
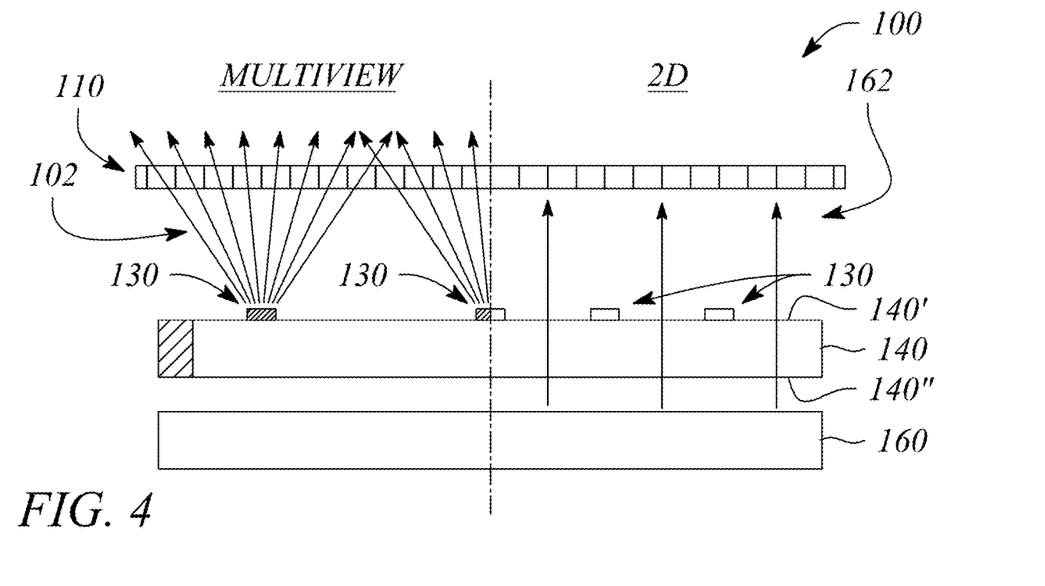
FIG. 4 illustrates a cross-sectional view of a multiview display comprising a broad-angle backlight in an example, according to an embodiment of the principles described herein.

In some embodiments, the multiview display 100 further comprises a broad-angle backlight 160 adjacent to the light guide 140. FIG. 4 illustrates a cross-sectional view of a multiview display 100 comprising a broad-angle backlight 160 in an example, according to an embodiment of the principles described herein. The broad-angle backlight 160 is opposite to a side of the light guide 140 adjacent to the light valve array. In the embodiment illustrated, the broad-angle backlight 160 is adjacent to a bottom surface 140" of the light guide 140. The broad-angle backlight 160 is configured to provide or emit broad-angle light 116.

The light guide 140 and the array of multibeam elements 130' may be configured to be optically transparent to the broad-angle light 162 emitted from the adjacent broad-angle backlight 160. Thus, broad-angle light 162 may be emitted from the broad-angle backlight 160 and through a thickness of light guide 140. The broad-angle light 162 from the broad-angle backlight 160 is therefore received through the bottom surface 140" of the light guide 140, transmitted through a thickness of the light guide 140, and emitted from the array of light valves 110. Because the light guide 140 is optically transparent to the broad-angle light 162, the broad-angle light 162 is not substantially affected by the light guide 140.

The multiview display 100 of FIG. 4 may selectively operate in a two-dimensional (2D) mode or a multiview mode (MULTIVIEW). In the 2D mode, the multiview display 100 is configured to emit the broad-angle light 162 provided by the broad-angle backlight 160. In the multiview mode, the multiview display 100 is configured to emit the directional light beams 102, as previously described. The combination of the light guide 140 and broad-angle backlight 160 may be used in dual (2D/3D) display, for example.

In some embodiments (not illustrated), a user tracker may be employed with the multiview display 100 as part of a multiview display system. According to various embodiments, the user tracker is configured to track a location or a position of the user 101 relative to the multiview display 100 to provide the user position. In particular, the user tracker may be configured to track a position of the user 101 (e.g., of a head of the user) in a region in front of the multiview display 100, that is, a region adjacent to a light emitting surface or an image view screen of the multiview display 100.

According to various embodiments, any of a variety of devices, systems and circuits that provide user tracking (or equivalently tracking of a position of the user) may be employed as the user tracker of the multiview display system. The user tracker may thus comprise a position sensor. For example, in some embodiments, the user tracker comprising a position sensor may comprise a camera configured to capture an image of the user relative to the screen of the multiview display 100. Further, the user tracker may comprise an image processor (or general purpose computer programmed as an image processor) configured to determine a position of the user within the captured image relative to the screen of the multiview display 100. The user position relative to the screen of the multiview display 100 may be determined from the captured image by the image processor using various techniques including, but not limited to, image recognition or pattern matching, for example. Further, the user tracker may comprise a motion sensor. The user tracker comprising a motion sensor may comprise one or both of a hardware-based motion sensor and a software-based motion sensor. The hardware-based motion sensors may comprise a gyroscope, an accelerometer, a magnetometer, or a geomagnetic sensor, for example. Software-based sensors may comprise one or more of a gravity sensor, a linear acceleration sensor, a rotation vector sensor, and a step detector (e.g., a 'significant' motion sensor, a step counter, etc.). The hardware-based and software-based motion sensors are configured to track a relative motion of the multiview display 100. The motion of the user relative to the multiview display 100 may be used to infer a position of the user with respect to the multiview display 100. In some embodiments, the user tracker may comprise both position sensor and a motion sensor.

Figure 5:
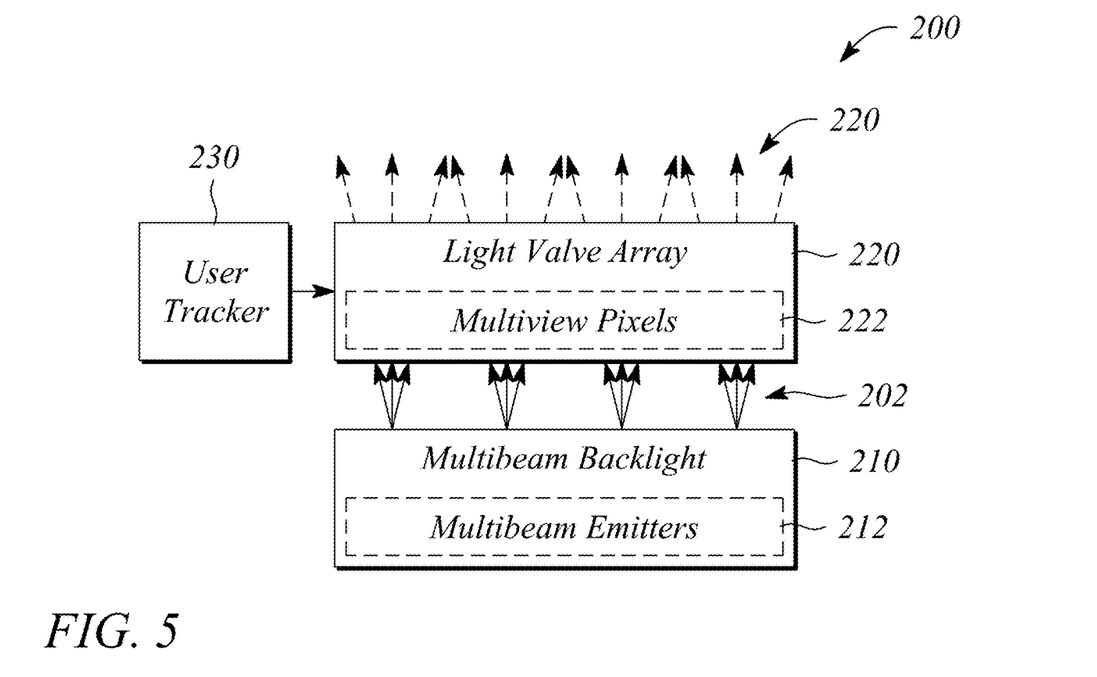
FIG. 5 illustrates a block diagram of a multiview display system in an example, according to an embodiment consistent with the principles herein.

In accordance with some embodiments of the principles described herein, a multiview display system 200 is provided. FIG. 5 illustrates a block diagram of a multiview display system 200 in an example, according to an embodiment consistent with the principles herein. The multiview display system 200 comprises a multibeam backlight 210. The multibeam backlight 210 is configured to provide emitted light as a plurality of directional light beams 202 having principal angular directions corresponding to respective view directions of the multiview display. The multibeam backlight 210 may be shaped as a 'slab' or substantially flat block of substrate comprising two substantially parallel and opposite planar surfaces (i.e., a top and a bottom surface).

The multiview display system 200 further comprises an array of light valves 220 having a repeating plurality of color sub-pixels. The light valves of the array are substantially similar to the light valves 110 of the multiview display 100, previously described. As such, different types of light valves may be employed as the light valves 220 of the light valve array including, but not limited to, one or more of liquid crystal light valves, electrophoretic light valves, and light valves based on electrowetting. In some embodiments, each color sub-pixel of the repeating plurality of color sub-pixels has a different color. For example, the repeating plurality of color sub-pixels may consist of a repeating set of red (R), green (G), and blue (B) color sub-pixels (RGB) in this order along a row of the array of light valves 220. In other embodiments, the repeating plurality of color sub-pixels may comprise a repeating set of red (R), green (G), blue (B), and yellow (Y) color sub-pixels (RGBY). In yet another embodiment, the repeating set may include red (R), green (G), blue (B), and white (W) pixels (RGBW). The light valves 220 of the light valve array are arranged as multiview pixels 222 configured to modulate the directional light beams 202 as color pixels of views of a multiview image.

The multiview display system 200 further comprises a user tracker 230 configured to track a position of a user relative to the multiview display. The user tracker 230 may comprise a position sensor. For example, the user tracker comprising a motion sensor may comprise a camera to capture an image of the user relative to the screen of the multiview display system 200. The user tracker 230 comprising a motion sensor may further comprise a processor configured to determine a position of the user within the captured image relative to the screen of the multiview display system 200. The position of the user relative to the screen of the multiview display system 200 may thus be determined from the captured image. Further, the user tracker 230 may comprise a motion sensor configured to track a relative motion of the multiview display system 200. The motion of the user relative to the multiview display system 200 may be used to infer a position of the user with respect to the multiview display system 200. In some embodiments, the user tracker 230 may comprise both a position sensor and a motion sensor. In some embodiments, the user tracker 230 may be substantially similar to the user tracker described above with respect to multiview display 100.

According to various embodiments, locations of the multiview pixels 222 relative to locations of color sub-pixels of the light valve array are configured to be shifted as a function of the tracked user position to provide dynamic color sub-pixel remapping. In some embodiments, the dynamic color sub-pixel remapping may be substantially similar to the dynamic color sub-pixel remapping of the above-described multiview display 100, e.g., as illustrated in and described with respect to FIGS. 3A and 3B. In particular, in response to the user moving in position relative to the multiview display system 200, one or more multiview pixels 222 may be remapped to a different set of color sub-pixels of the repeating plurality of color sub-pixels of the array of light valves 220. The shift may be replicated for all multiview pixels 222 of the multiview display system 200, and a different set of color sub-pixels forms each multiview pixel 222, e.g., as in FIGS. 3A-3B. In various examples, the multiview pixels 222 are shifted in the direction of the plurality of color sub-pixels to follow the tracked position of the user in order to maintain the color balance in the view aligned with the user position.

In some embodiments, the shift distance of the multiview pixel location is an integer multiple of a size of a color sub-pixel of the color sub-pixel plurality. For example, the multiview pixels 222 may be shifted by a distance about equal to a width of one of the color sub-pixels of the light valve array, e.g., as illustrated in FIGS. 3A and 3B. In other embodiments, the shift distance may be about equal to two times a color sub-pixel width, three times a color sub-pixel width, and so on, for example.

In some embodiments, the multibeam backlight 210 comprises a plurality of multibeam emitters 212 distributed across the multibeam backlight. Multibeam emitters 212 of the plurality may be substantially similar to the multibeam emitters 130 described above with respect to the multiview display 100. In particular, multibeam emitters 212 of the multibeam emitter plurality are configured to provide directional light beams 202 of the directional light beam plurality of the light emitted by the multiview display system 200. The multibeam emitters 212 of the plurality may be located on a surface of or within the multibeam backlight 210, according to various embodiments.

In some embodiments (not illustrated), the multibeam backlight 210 further comprises a light guide. The light guide is configured to guide light in a propagation direction along a length of the light guide as guided light. The light guide may be substantially similar to the light guide 140 of the above-described multiview display 100, in some embodiments. According to various embodiments, the light guide may be configured to guide the guided light using total internal reflection. Further, the guided light may be guided at a non-zero propagation angle by or within the light guide. In some embodiments, the guided light may be collimated or may be a collimated light beam. In particular, the guided light may be collimated according to or having a collimation factor σ, in various embodiments.

In some embodiments, a multibeam emitter of the plurality of multibeam emitters 212 comprises a multibeam element. In some embodiments, the multibeam element may be substantially similar to the multibeam element 130' described above. The multibeam element is configured to scatter out a portion of the guided light as the directional light beams 202 of the multiview display system 200. According to various embodiments, the multibeam element may be located on a surface of or within the light guide.

In some embodiments, a size of the multibeam emitter 212 or the element is comparable to a size of a light valve 220 of the light valve array. In some embodiments, the size of the multibeam emitter or element is comparable to the light valve size such that the multibeam element size is between about fifty percent (50%) and about two hundred percent (200%) of the light valve size.

In some embodiments, the multibeam element may comprise any of a number of different structures configured to scatter out a portion of the guided light. For example, the different structures may include, but are not limited to, diffraction gratings, micro-reflective elements, micro-refractive elements, or various combinations thereof. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

Figure 6:
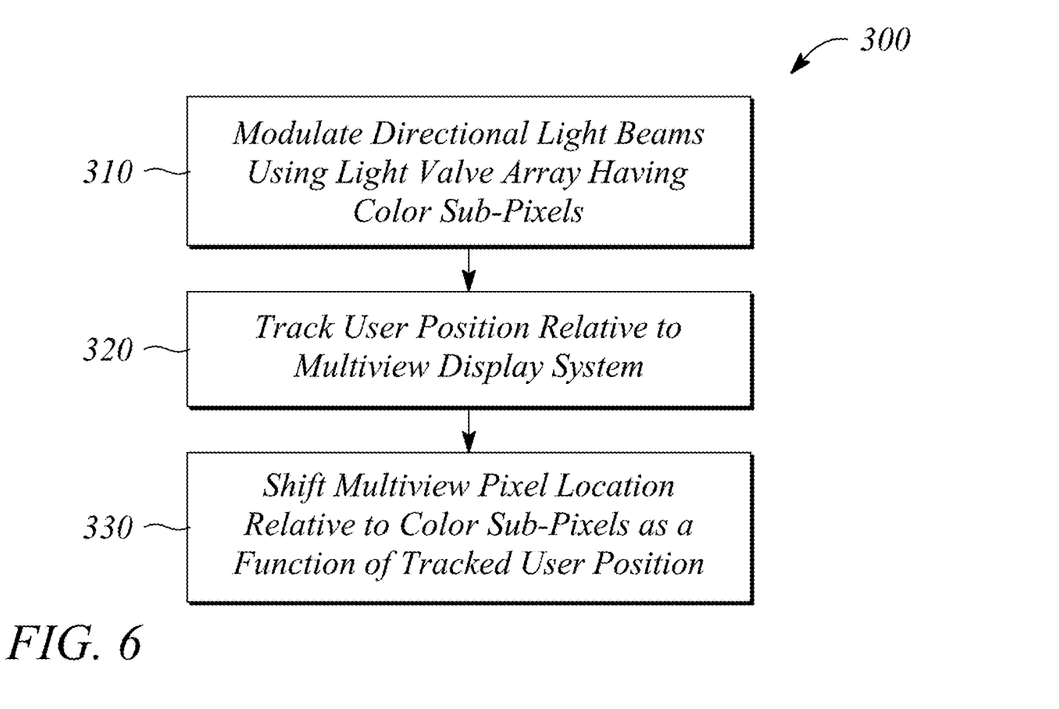
FIG. 6 illustrates a flowchart of a method of a multiview display system operation in an example, according to an embodiment consistent with the principles described herein.

In accordance with some embodiments of the principles described herein, a method 300 of multiview display system operation is provided. FIG. 6 illustrates a flowchart of a method 300 of a multiview display system operation in an example, according to an embodiment consistent with the principles described herein. The method 300 of multiview display system operation comprises modulating 310 directional light beams using an array of light valves having a repeating plurality of color sub-pixels. The array of light valves may be substantially similar to the array of light valves 110 described above with respect to the multiview display 100. As such, different types of light valves may be employed as the light valves of the light valve array including, but not limited to, one or more of liquid crystal light valves, electrophoretic light valves, and light valves based on electrowetting. In some embodiments, each color sub-pixel of the repeating plurality of color sub-pixels has a different color. For example, the repeating plurality of color sub-pixels may consist of a repeating set of red (R), green (G), and blue (B) color sub-pixels (RGB) in this order along a row of the array of light valves. The repeating plurality of color sub-pixels is arranged as a plurality of multiview pixels to provide color pixels of views of a multiview image, according to various embodiments.

The method 300 further comprises tracking 320 a position of a user relative to the multiview display system with a user-tracking module to provide a tracked position of the user. In some embodiments, the user-tracking module may be substantially similar to the user tracker 230 of the multiview display system 200, described above. For example, the user-tracking module may comprise a position sensor configured to provide a position of the user relative to the multiview display system. Further, the user-tracking module may comprise a motion sensor configured to track a relative motion of the multiview display. The motion the user relative to the multiview display system may be used to infer a position of the user with respect to the multiview display system, for example. In some embodiments, the user-tracking module may comprise both a position sensor and a motion sensor.

As illustrated in FIG. 6, the method 300 further comprises shifting 330 a location of a multiview pixel of the multiview pixel plurality relative to a location of color sub-pixels of the light valve array as a function of the tracked user position to provide dynamic color sub-pixel remapping and mitigate color fringing perceived by the user when viewing the multiview display. In some embodiments, shifting 330 may be substantially similar to the shift as previously described with respect to either the multiview display 100 or multiview display system 200. In some embodiments, the shifting 330 changes the location of the multiview pixel by an integer multiple of a size of a color sub-pixel in a row direction of the color sub-pixels.

In some embodiments, the method 300 further comprises emitting the directional light beams using an array of multibeam emitters. The multibeam emitters of the array may be substantially similar to the multibeam emitters 130 of the multiview display 100, as described above. In some embodiments, emitting the directional light beams comprises guiding light in a light guide as guided light. The light guide may be substantially similar to the light guide 140 of the multiview display 100, and light may be guided at a non-zero propagation angle between opposite internal surfaces of the light guide. In some embodiments, the multibeam emitters of the multibeam emitter array may be multibeam elements of a multibeam element array, each multibeam element corresponding to a different multibeam emitter of the multibeam emitter array. With the multibeam emitter array being an array of multibeam elements, emitting the directional light beams using the array of multibeam emitters may further comprise scattering out a portion of the guided light from the light guide using a multibeam element of the multibeam element array to provide the directional light beams. The multibeam element may be substantially similar to the multibeam element 140' of the multiview display 100. Further, the multibeam emitter or the multibeam element may have a size comparable to a size of a light valve of the light valve array. For example, the size of the multibeam emitter or multibeam element may be comparable to the light valve size such that the multibeam element size is between about fifty percent (50%) and about two hundred percent (200%) of the light valve size.

In some embodiments, tracking a position of a user relative to the multiview display system comprises monitoring a relative motion of the multiview display system using a motion sensor to infer the user position from the relative motion. In some embodiments, wherein tracking a position of a user relative to the multiview display system comprises tracking the user position with a position sensor. In some embodiments, tracking a user position comprises both monitoring the relative motion using a motion sensor and tracking the user position with a position sensor. According to various embodiments, the motion sensor may comprise, but is not limited to, one or both of a gyroscope and an accelerometer. In some embodiment, the position sensor may comprise, but is not limited to, one or more of a capacitive sensor, a camera, and a time-of-flight sensor.

Thus, there have been described examples and embodiments of a multiview display, a multiview display system, and a method of multiview display system operation having multiview pixels configured to be shifted relative to a repeating plurality of color sub-pixels to provide dynamic color sub-pixel mapping. It should be understood that the above-described examples are merely illustrative of some of the many specific examples that represent the principles described herein. Clearly, those skilled in the art can readily devise numerous other arrangements without departing from the scope as defined by the following claims.

What is claimed is:
1. A multiview display comprising:
   an array of light valves having a repeating plurality of color sub-pixels and arranged as a plurality of multiview pixels configured to modulate directional light beams as color pixels of views of a multiview image; and
   an array of multibeam emitters configured to provide the directional light beams,
   wherein a location of a multiview pixel of the multiview pixel plurality relative to a location of color sub-pixels of the light valve array is configured to be shifted as a function of a position of a user of the multiview display to provide dynamic color sub-pixel remapping.

2. The multiview display of claim 1, wherein a shift distance of the multiview pixel location is an integer multiple of a size of a color sub-pixel of the repeating color sub-pixel plurality.

3. The multiview display of claim 1, wherein each color sub-pixel of the repeating plurality of color sub-pixels has a different color, the modulated light beams representing the respective different colors within the color pixels of the multiview image.

4. The multiview display of claim 3, wherein the repeating plurality of color sub-pixels comprises a red color sub-pixel, a green color sub-pixel, and a blue color sub-pixel.

5. The multiview display of claim 1, wherein a shift of the location of the multiview pixel is in a direction corresponding to a row direction of the light valve array.

6. The multiview display of claim 1, further comprising:
a light guide configured to guide light along a length of the light guide; and
an array of multibeam elements spaced apart from one another along the light guide length, a multibeam element of the multibeam element array having a size comparable to a size of a light valve of the light valve array and being configured to scatter out from the light guide a portion of the guided light as the directional light beams,
wherein the multibeam element array is the multibeam emitter array, each multibeam element of the multibeam element array corresponding to a different multibeam emitter of the multibeam emitter array.

7. The multiview display of claim 6, wherein the multibeam element comprises one or more of a diffraction grating configured to diffractively scatter out the portion of the guided light as the directional light beams, a micro-reflective structure configured to reflectively scatter out the portion of the guided light as the directional light beams, and a micro-refractive structure configured to refractively scatter out the portion of the guided light as the directional light beams.

8. The multiview display of claim 6, further comprising a broad-angle backlight adjacent to a side of the light guide opposite to a side adjacent to the light valve array, the broad-angle backlight being configured to provide broad-angle emitted light during a two-dimensional (2D) mode of the multiview display, the light valve array being configured to modulate the broad-angle emitted light as a 2D image,
wherein the light guide and multibeam element array are configured to be transparent to the broad-angle emitted light, the multiview display being configured to display the multiview image during a multiview mode and the 2D image during the 2D mode.

9. A multiview display system comprising the multiview display of claim 1, the multiview display system further comprising a user tracker configured to track a position of the user relative to the multiview display to provide the user position.

10. The multiview display system of claim 9, wherein the user tracker comprises one or both of a position sensor configured to track the user position and a motion sensor configured to monitor a relative motion of the multiview display, the relative motion being used to infer the user position.

11. A multiview display system comprising:
a multibeam backlight configured to provide emitted light as a plurality of directional light beams having different principal angular directions corresponding to respective different view directions of the multiview display,
an array of light valves having a repeating plurality of color sub-pixels and arranged as multiview pixels configured to modulate the directional light beams as color pixels of views of a multiview image; and
a user tracker configured to track a position of a user relative to the multiview display,
wherein locations of the multiview pixels relative to locations of color sub-pixels of the light valve array are configured to be shifted as a function of the tracked user position to provide dynamic color sub-pixel remapping.

12. The multiview display system of claim 11, wherein a shift distance of the multiview pixel locations is an integer multiple of a size of a color sub-pixel of the color sub-pixel plurality.

13. The multiview display system of claim 11, wherein the multibeam backlight comprising a plurality of multibeam emitters spatially distributed across the multibeam backlight, each multibeam emitter of the multibeam emitter plurality being configured to provide directional light beams of the directional light beam plurality.

14. The multiview display system of claim 13, the multibeam backlight further comprising:
a light guide configured to guide light along a length of the light guide as guided light, the multibeam emitter comprising a multibeam element having a size comparable to a size of a light valve of the light valve array and being configured to scatter out a portion of the guided light as the plurality of directional light beams.

15. The multiview display system of claim 14, wherein the multibeam element comprises one or more of a diffraction grating configured to diffractively scatter out the portion of the guided light as the plurality of directional light beams, a micro-reflective structure configured to reflectively scatter out the portion of the guided light as the plurality of directional light beams, and a micro-refractive structure configured to refractively scatter out the portion of the guided light as the plurality of directional light beams.

16. The multiview display system of claim 15, wherein the user tracker comprises one or both of a position sensor configured to track the position of the user relative to the multiview display and a motion sensor configured to monitor a relative motion of the multiview display, the relative motion being used to infer the user position relative to the multiview display.

17. A method of multiview display system operation, the method comprising:
modulating directional light beams using an array of light valves having a repeating plurality of color sub-pixels and arranged as a plurality of multiview pixels to provide color pixels of views of a multiview image; and
tracking a position of a user relative to the multiview display system using a user-tracking module to provide a tracked position of the user; and
shifting a location of a multiview pixel of the multiview pixel plurality relative to a location of color sub-pixels of the light valve array as a function of the tracked user position to provide dynamic color sub-pixel remapping and mitigate color fringing perceived by the user when viewing the multiview display system.

18. The method of multiview display system operation of claim 17, wherein shifting changes the location of the multiview pixel by an integer multiple of a size of a color sub-pixel in a row direction of the color sub-pixels.

19. The method of multiview display system operation of claim 17, further comprising emitting the directional light beams using an array of multibeam emitters, wherein emitting the directional light beams comprises:
guiding light in a light guide as guided light; and
scattering out a portion of the guided light using a multibeam element of an array of multibeam elements to provide the directional light beams, a size of the multibeam element being comparable to a size of a light valve of the light valve array,
wherein the multibeam element array is the multibeam emitter array, each multibeam element of the multibeam element array corresponding to a different multibeam emitter of the multibeam emitter array.

20. The method of multiview display system operation of claim 17, wherein tracking a position of a user relative to the multiview display system using a user-tracking module comprises one or both of:

monitoring a relative motion of the multiview display system using a motion sensor to infer the user position from the relative motion; and tracking the user position with a position sensor, wherein the motion sensor comprises one or both of a gyroscope and an accelerometer, and wherein the position sensor comprises one or more of a capacitive sensor, a camera, and a time-of-flight sensor.

* * * * *